C. M. LEHIGH.
RAKE.
APPLICATION FILED SEPT. 10, 1908.

938,882.

Patented Nov. 2, 1909.

Witnesses
Chas. C. Richardson
I. M. Mills

Inventor
Claude M. Lehigh,
By Chandler Chandler
Attorney

UNITED STATES PATENT OFFICE.

CLAUDE M. LEHIGH, OF CHICAGO, ILLINOIS.

RAKE.

938,882. Specification of Letters Patent. Patented Nov. 2, 1909.

Application filed September 10, 1908. Serial No. 452,447.

*To all whom it may concern:*

Be it known that I, CLAUDE M. LEHIGH, a citizen of the United States, residing at Chicago, in the county of Cook, State of Illinois, have invented certain new and useful Improvements in Rakes; and I do hereby declare the following to be a full, clear, and exact description of the invention, such as will enable others skilled in the art to which it appertains to make and use the same.

This invention has relation to a new and novel improvement in rakes.

The object of my invention is to provide a garden rake so constructed that the rake teeth may be freed of any material collecting between the teeth.

Figure 1:
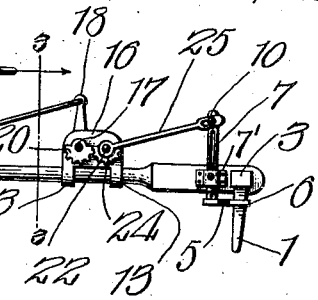
Figure 1:
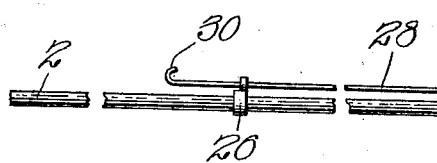
Figure 2:
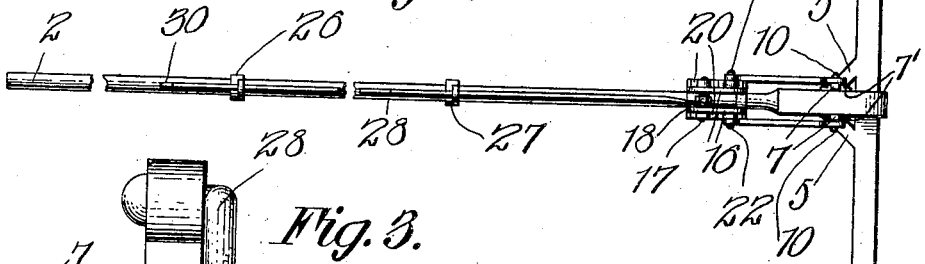
Figure 3:
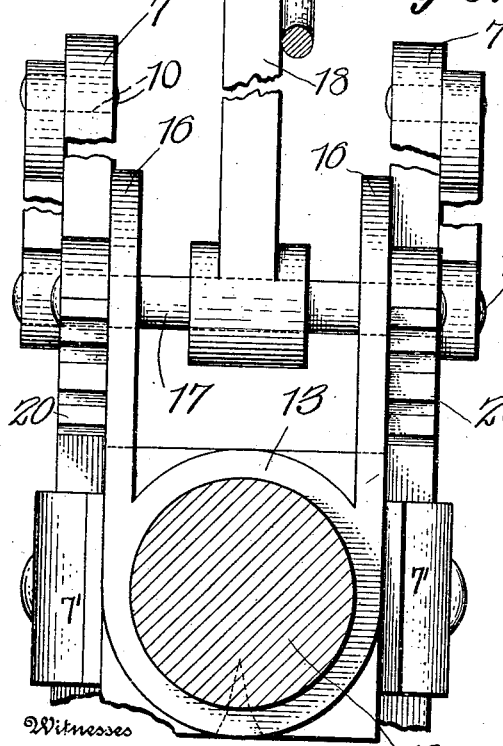
Figure 4:
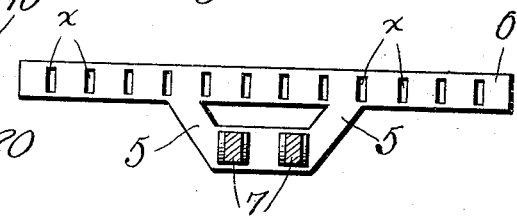

In the accompanying drawings I have shown in Figure 1 a side view of a rake embodying my invention. Fig. 2 shows a top view of my rake. Fig. 3 shows an enlarged detached detail of the U-shaped holding plate the view being a section on the line 3—3 of Fig. 1. Fig. 4 shows a top view of the clearer bar.

The object of my invention is to provide a rake so constructed that the teeth of the same may be kept clean and free of any obstructing material between the teeth thereof.

In the accompanying drawings 2 represents the rake handle to which an ordinary rake head is secured comprising the teeth 1 projected from the head 3.

In order to prevent any material from clogging between the rate teeth 1, I provide a perforated clearer bar 6 provided with a number of openings *x* through which the rake teeth 1 extend, as shown in Fig. 1. This clearer bar is provided with the two projecting brackets 5 to which the slotted guide arms 7, 7 are secured. At their upper ends these guide arms are provided with the pins 10 disclosed in Fig. 2. The arms 7 are secured to the rake handle by means of suitable ears 7'.

Secured to the rake handle 2 by means of the securing collars 13 is a U-shaped holding plate 16 provided near one end with the shaft 17 supporting the rock arm 18 as disclosed in Fig. 3. At its end this shaft 17 has secured to it the two equi-formed gear sectors 20, 20. Extending from the sides of the U-shaped holding-plate are two supporting pins 22, each pin supporting an arm-provided gear sector 24, the arms 25 of which work into the slots of the guide-arms and are held against the pins 10 as shown in Fig. 1. Secured to the rake handle 2 are the guide ears 26 and 27 through which an operating bar 28 is made to pass which bar at its lower end is secured to the rockarm 18 as shown in Fig. 1. Now should any material collect and clog between the rake teeth 1 the operator would pull up the rod 28 which is provided with a terminal finger hook 30 which would cause the gear sectors 20 to rock, resulting in the arm-provided gear sectors also being rocked so that the clearer bar 6 will be carried downward to remove any material that may have collected between the rake teeth. The device is light and simple and may be readily operated.

Having thus described my invention, what I claim as new is—

1. In combination with a toothed rake head having a handle, a perforated clearer bar, means to guide said clearer bar longitudinally of the teeth of said rake head comprising brackets projecting from said bar, guide arms secured to said brackets, ears slidably securing said guide arms to said rake handle, a bracket on said handle, an element connected to said guide arms supported in said bracket, and means on said handle to rotate said element and depress said clearer bar.

2. In combination with a toothed rake head having a handle, a clearer bar, means to guide said clearer bar longitudinally of the teeth of said rake head comprising brackets projecting from said bar, slotted guide arms secured to said brackets, and ears slidably securing said slotted arms to said rake handle; a bracket on said handle, an element connected to said guide arm supported in said bracket, a gear sector carried by said element, a second gear sector meshing therewith, and means to rotate said second gear sector and depress said clearer bar.

3. The combination with a rake head having a handle, of a clearer bar, a pair of brackets projecting from said bar, guide arms secured to said brackets, ears slidably securing said arms to said rake handle, a holding plate provided with securing collars, a shaft mounted in said holding plate, arms attached to said shaft and connected with the guide arm, a second shaft mounted in said holding plate, a rock arm on said second shaft, a pair of gears connecting said shafts, and an operating bar secured to said rock arm.

4. The combination with a rake head having a handle of a perforated clearer bar, the teeth of said rake passing through said bar perforations, two brackets projecting from said bar, slotted guide-arms secured to said brackets, ears slidably securing said slotted arms to said rake handle, a U-shaped holding plate, provided with securing collars, two arm-provided gear sectors pivotally secured to the sides of said holding plate, a shaft held by said plate, a rock-shaft meshing with said arm provided gear sectors, and an operating bar secured to said rock arm, as set forth.

In testimony whereof, I affix my signature, in presence of two witnesses.

CLAUDE M. LEHIGH.

Witnesses:
 FRANK H. CULVER,
 JENNIE L. SCOTT.